United States Patent
Chakra et al.

(10) Patent No.: US 7,801,284 B1
(45) Date of Patent: Sep. 21, 2010

(54) VOICE TERMINAL FOR DIALING BY NAME WITH PRESENCE

(75) Inventors: Rabih Abou Chakra, Cormeilles en Parisis (FR); Jack Jachner, Plano, TX (US)

(73) Assignee: Alcatel Lucent, Paris (FR)

( * ) Notice: Subject to any disclaimer, the term of this patent is extended or adjusted under 35 U.S.C. 154(b) by 259 days.

(21) Appl. No.: 11/227,638

(22) Filed: Sep. 15, 2005

Related U.S. Application Data

(60) Provisional application No. 60/677,127, filed on May 3, 2005.

(51) Int. Cl.
    *H04M 1/64* (2006.01)

(52) U.S. Cl. .............. 379/88.03; 379/93.17; 379/93.23; 455/414.1

(58) Field of Classification Search ... 379/88.01–88.03, 379/201.06, 210.01, 201.1, 88.22, 90.01, 379/93.17, 93.23, 93.24; 709/224; 455/456.1, 455/412.1, 564, 412.2, 414.1; 340/407.1
See application file for complete search history.

(56) References Cited

U.S. PATENT DOCUMENTS

| | | | |
|---|---|---|---|
| 6,223,057 B1 * | 4/2001 | Sone ........................... | 455/564 |
| 7,206,388 B2 * | 4/2007 | Diacakis .................. | 379/88.03 |
| 7,443,283 B2 * | 10/2008 | Schmandt et al. ........ | 340/407.1 |
| 2003/0206619 A1 * | 11/2003 | Curbow et al. ......... | 379/210.01 |
| 2004/0120490 A1 | 6/2004 | Grabenstaetter et al. | |
| 2005/0276397 A1 * | 12/2005 | Hiatt et al. ............... | 379/90.01 |

* cited by examiner

*Primary Examiner*—MD S Elahee
(74) *Attorney, Agent, or Firm*—Garlick Harrison & Markison

(57) ABSTRACT

A voice terminal provides an enhanced dial-by-name feature using presence information indicating availability of subscribers. The voice terminal includes an input device configured to receive input from a user indicating directory search criteria for searching a directory of subscribers to identify those subscribers matching the input and a user interface operable to provide both a list of subscribers matching the input and presence information on each of the subscribers in the list.

14 Claims, 6 Drawing Sheets

VOICE TERMINAL FOR DIALING BY NAME WITH PRESENCE

BENEFIT CLAIM UNDER 35 U.S.C. §119(e)

This application claims the benefit of U.S. Provisional Application No. 60/677,127, filed May 3, 2005.

BACKGROUND OF THE INVENTION

1. Technical Field of the Invention

The present invention relates in general to a voice terminal in a presence-based communications system, and in particular, to dialing by name from a voice terminal using presence information.

2. Description of Related Art

Presence-based interactive communication services facilitate more efficient and effective communication sessions by enabling callees (presentities) to publish, in real time, their presence information (such as, the availability, activity, local time, location, current status of the active devices/applications, etc.) and their preference information (e.g., device preferences) to callers (presence watchers). The presence and preference information improves the efficiency of establishing various types of communication sessions, such as voice, text and multi-media (video+) communication sessions.

Presence systems typically incorporate a presence server that manages presence information for a plurality of presentities. Presence servers operate to collect presence information from a variety of presence sources, such as calendar/scheduler applications, telephone applications or instant messaging applications, and aggregate the presence information to reflect the presence state of the presentities. For example, whenever a predefined presentity event occurs, such as turning on or off a presentity device, modifying the registration from a device, changing the instant messaging status on a device or entering a scheduled event into the presentity's calendar, the responsible presence source generates presence information to the presence server. By way of example, if a presentity has a meeting scheduled on his or her calendar from 10:00 a.m. to 12:00 p.m., at 10:00 a.m., the calendar/scheduler application notifies the presence server to set the presentity's presence status to "In a Meeting." As another example, when a presentity initiates or answers a phone call, the telephone application notifies the presence server to set the presentity's presence status to "On the Phone."

This presence information is currently accessible through computer networks, and as such, is available for viewing on computer terminals. For example, assuming both an originating user and a destination user are working for the same enterprise, which has installed a presence-enhanced active directory (AD), the originating user can search the enterprise AD through the user's computer terminal to find the destination user and obtain the destination user's current availability and communications preference. Once the contacting address and presence status of the destination user is determined, the originating user can attempt to establish a communication session using the proper communication medium that matches the communications preference of the destination user. For example, the originating user can initiate a communication session using a "Click-to-Dial" feature provided on the computer graphical user interface.

However, when using a voice terminal to access the enterprise directory through, for example, a "Dial-by-Name" feature, the presence information of the destination user is currently not available. Voice terminals are currently not integrated with presence systems. As a result, voice terminals are not capable of displaying the availability of the destination user, as determined from presence information. Instead, the "Dial-by-name" feature only allows the originating user to access the enterprise directory to search for and retrieve the particular telephone extension of the destination user. Therefore, what is needed is a presence system for enhancing the "Dial-by-Name" feature with presence information.

SUMMARY OF THE INVENTION

Embodiments of the present invention provide a voice terminal with a dial-by-name feature enhanced by presence information indicating availability of subscribers. The voice terminal includes an input device configured to receive input from a user indicating directory search criteria for searching a directory of subscribers to identify those subscribers matching the input and a user interface (graphical or audio) operable to provide both a list of subscribers matching the input and presence information on each of the subscribers in the list.

In one embodiment, the presence information is organized into presence levels. A first presence level includes presence information indicating availability of the subscribers in the list. A subsequent presence level includes presence information providing call options for initiating a communication with a select one of the subscribers in the list. For example, the voice terminal can receive a select one of the call options and initiate the communication to the select subscriber using the select call option. Other subsequent presence levels include presence information indicating availability of a select subscriber per media type.

Embodiments of the present invention further provide a communication system capable of providing an enhanced dial-by-name feature. The communication system includes a directory of subscribers, a presence system for collecting and storing presence information on the subscribers and a voice terminal for receiving input from a user indicating directory search criteria for searching the directory to identify those subscribers matching said input and providing both a list of subscribers matching the input and presence information on each of the subscribers in the list. The communication system further includes an interface between the voice terminal, the directory and the presence system for receiving the input from the voice terminal, accessing the directory to retrieve the list of subscribers, providing the list of subscribers to the presence system and providing the list of subscribers and presence information to the voice terminal.

In one embodiment, the presence system further maintains preference information for each of the subscribers for use in filtering the presence information provided to the voice terminal.

Embodiments of the present invention further provide a method for providing presence information to a voice terminal to enhance a dial-by-name feature. The method includes maintaining a directory of subscribers and presence information indicating availability of each of the subscribers in the directory. The method further includes receiving input on the voice terminal indicating directory search criteria for searching the directory, accessing the directory to identify the subscribers matching the input, retrieving presence information on each of the matching subscribers and providing a list of matching subscribers and presence information on each of the matching subscribers to the voice terminal.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
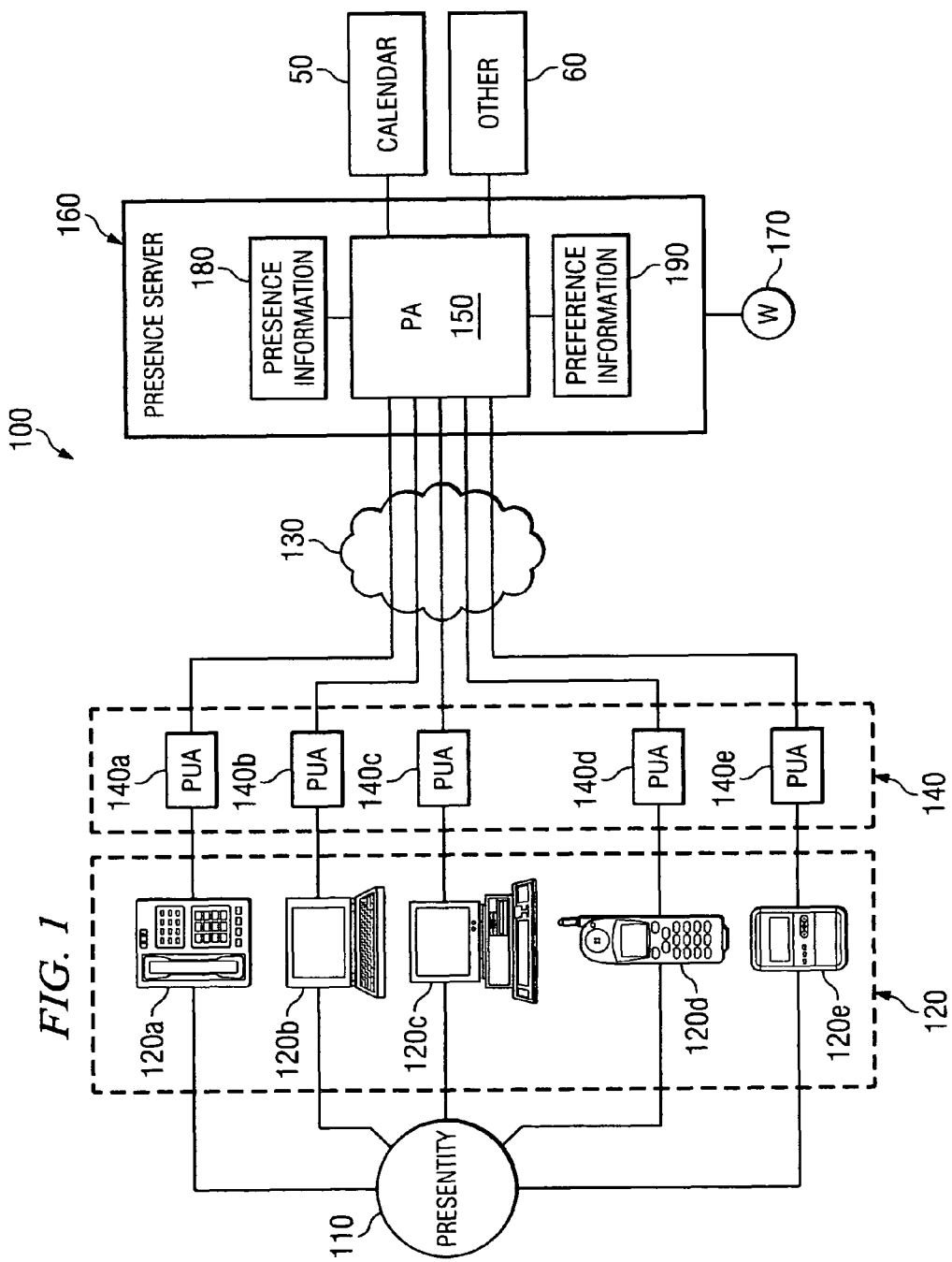
FIG. 1 illustrates an exemplary presence system in accordance with embodiments of the present invention.

Referring to FIG. 1, there is illustrated an exemplary presence system 100 capable of implementing various embodiments of the present invention. The presence system 100 includes a presentity 110 and one or more devices 120 associated with the presentity 110. The presentity 110 represents the callee and provides presence information on the callee's presence status to the presence system 100. Each device 120 is a physical communications device capable of sending and/or receiving communications over a communications network 130. Examples of such devices 120 include, but are not limited to, a desktop phone 120a, a laptop computer 120b, a personal computer 120c, a cell phone 120d and a personal digital assistant (PDA) 120e. In FIG. 1, the communications network 130 represents any type of network over which media (circuit-switched or packet-switched voice or data) may be sent. For example, the communications network 130 can include the Public Switched Telephone Network (PSTN), Public Land Mobile Network (PLMN), one or more private local area networks (LANs), the Internet and/or any other type or combination of networks.

The presence system 100 further includes one or more presence user agents 140 (PUAs), a presence agent (PA) 150, a presence server 160 and one or more watchers 170 of the presentity 110. The PUAs 140 are capable of manipulating and providing presence information for the presentity 110. In FIG. 1, a separate PUA 140 is shown for each device 120. However, it should be understood that in other embodiments, the number of PUAs 140 can vary based on the number and type of devices 120, the applications supported by the devices 120 and the system configuration. Each PUA 140 independently generates a component of the overall presence information for a presentity 110. Typically, PUA 140 generates presence information when a change in presence status occurs. Examples of changes in presence status include, but are not limited to, turning on and off a device 120, modifying the registration from a device 120 and changing the instant messaging status on a device 120. Each PUA 140 receives presence state information either directly from a device 120 or through a system with knowledge of the presence state of a device.

The presence information from each of the PUAs 140 is collected by one or more presence agents (PAs) 150. In FIG. 1, only one PA 150 is shown for simplicity. However, it should be understood that in other embodiments, there can be multiple PAs 150 for a presentity 110, each of which is responsible for a subset of the total subscriptions (requests for presence information from watchers 170) currently active for the presentity 110. In addition, the PA 150 collects presence information from a calendar/scheduler application 50 (e.g., Microsoft Exchange Server®, IBM Lotus Notes® or other similar application) and other sources 60 of presence information (e.g., an instant messaging application). The PA 150 aggregates the presence information from each of the sources (e.g., PUA's 140, calendar 50 and other sources 60) and maintains the current complete presence information for the presentity 110. The PA 150 further provides the presence information to one or more watchers 170 (callers or communication session initiators) of the presentity 110.

The presence server 160 is a physical entity that can operate as either the PA 150 or as a proxy server for routing requests from watchers 170 to the PA 150. The presence server 160 stores the presence information 180 and preference information 190 for a plurality of presentities 110. Thus, the PA 150, in combination with the presence server 160, is operable to receive presence information of the presentity 110 from the PUAs 140, receive requests from watchers 170 for the presence information and provide the presence information to the watcher(s) 170. When acting as a PA 150, the presence server 160 can also be co-located with a PUA 140.

The presence server 160 further stores preference information 190 for the presentities 110 and watchers 170 of the presence system 100. Thus, the preference information 190 includes both presentity preference information (e.g., privacy filters) set by the presentity 110 for each watcher 170 and watcher preference information (e.g., watcher filters) set by each watcher 170 for the presentity 110. The preference information 190 serves to filter the presence information 180 of a presentity 110 provided to a watcher 170 to accommodate privacy concerns, prioritization requirements, administrator policies and security considerations.

The presence system 100 uses a presence protocol to provide presence services to presentities 110 and watchers 170. An example of a presence protocol that can be used in the presence system 100 is the Session Initiation Protocol (SIP), as described in J. Rosenberg, et al., "SIP: Session Initiation Protocol" RFC: 3261, June 2002 and in A. Roach, et al., "Session Initiation Protocol (SIP)—Specific Event Notification," RFC: 3265, June 2002, each of which are hereby incorporated by reference. SIP is an application-layer control protocol used to create, modify and terminate communication (voice, text and/or multimedia) sessions. SIP can be used with other protocols, such as the Real-time Transport Protocol (RTP), the Real-Time Streaming Protocol (RTSP), the Session Description Protocol (SDP), the International Telecommunication Union-Telecommunications ("ITU-T") H.263 standard (video CODEC), the G.711 and G.729 standards (audio CODECs), and other or additional standards or protocols. As will be appreciated, other or additional protocols and configurations may be used.

SIP networks are capable of routing requests from any user on the network to the server that maintains the registration state for a user. Thus, SIP networks enable a caller (watcher) to transmit a SUBSCRIBE request for presence information relating to a particular callee (presentity 110) to be routed to the presence server 160 that maintains the presence information for the presentity 110. In operation, the presence server 160 and PA 150 may be co-located with the SIP proxy/registrar for efficiency purposes.

Figure 2:
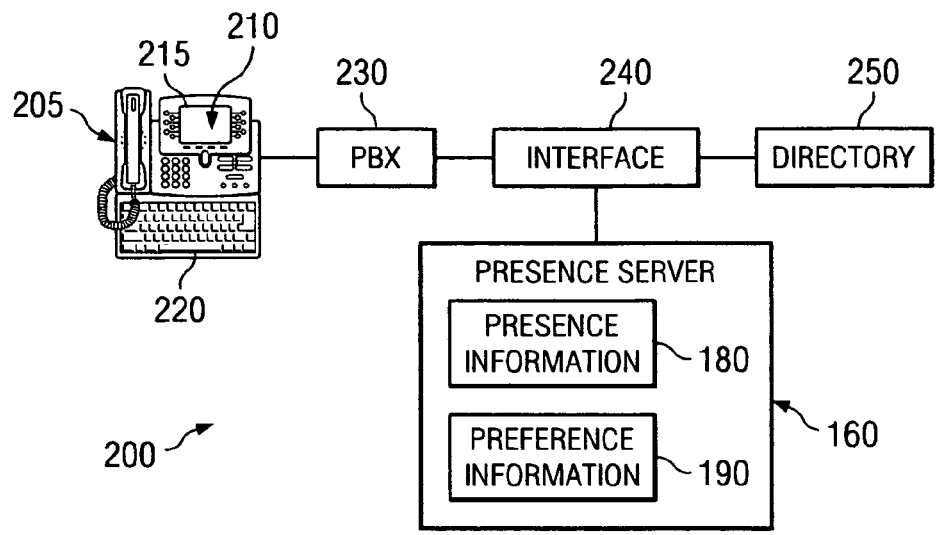
FIG. 2 illustrates an exemplary communications system incorporating a presence system for enhancing a dial-by-name feature on a voice terminal, in accordance with embodiments of the present invention.

Referring now to FIG. 2, there is illustrated an exemplary communications system 200 incorporating a presence system for enhancing a dial-by-name feature on a voice terminal 205 by displaying both the names and real-time presence state of potential destination user(s), in accordance with embodiments of the present invention. In FIG. 2, the voice terminal 205 is integrated with the presence system through an interface 240 to the presence server 160 to enhance the dial-by-name feature with presence information 180. In addition, the voice terminal 205 is connected to the interface 240 through a Private Branch Exchange (PBX) 230. PBX 230 represents any telephony server, such as a circuit switch, IP router, gateway or other device that is capable of routing messages and/or calls to and from the voice terminal 205.

The interface 240 includes any hardware, software, firmware, or combination thereof for interfacing between the voice terminal 205 and the presence server 160. As an example, the interface 240 could include one or more processors that execute instructions and one or more memories that store instructions and data used by the processors. The processor is generally understood to be a device that drives a general-purpose computer. It is noted, however, that other processor devices such as microcontrollers, Field Programmable Gate Arrays (FPGAs), or Application Specific Integrated Circuits (ASICs), or a combination thereof, can be used as well and achieve the benefits and advantages described herein.

In one embodiment, the interface 240 is included within the presence server 160. In another embodiment, the interface 240 is a stand-alone system capable of accessing the presence server 160. In a further embodiment, the interface 240 is included within a telephony server, such as PBX 230. For example, the interface 240 may be an application running on PBX 230.

The interface 240 is configured to construct requests for presence information to the presence server 160 and to provide presence information from the presence server 160 to the voice terminal 205. In addition, the interface 240 is configured to access a directory 250 of subscribers subscribing to the communication system 200 and/or presence system and to retrieve subscriber identities from the directory 250. In one embodiment, the directory 250 is an enterprise directory, and includes the names and telephone extensions of each employee of the enterprise. In other embodiments, the directory 250 is a listing of subscribers to a local area network (LAN), wide area network (WAN), data network (e.g., Internet Service Provider) or other type of communication network.

The voice terminal 205 includes a user interface 210 and an input device 220. In an exemplary embodiment, as shown in FIG. 2, the user interface 210 is a graphical user interface displayed on a display 215. In another embodiment, the user interface 210 is an audio user interface. In addition, as shown in FIG. 2, the input device 220 is an alphanumeric keyboard. However, in other embodiments, the input device 220 includes a keypad, soft keyboard (e.g., touch screen), microphone or other similar device that enables a user to enter information into the voice terminal 205. For example, in embodiments in which the input device 220 includes a microphone, the microphone is operable to receive the input from the user as speech and to transmit the speech input to a voice recognition system, which is either located within the voice terminal 205 or connected to the voice terminal 205.

The input device 220 is configured to receive input from a user, and in some embodiments, the entered input is displayed to the user through the graphical user interface 210 on the display 215. The input indicates directory search criteria for searching the directory 250 of subscribers to identify those subscribers within the directory 250 that match the input. For example, in one embodiment, the input includes one or more letters of the first and/or last name of one of the subscribers in the directory 250. In another embodiment, the input represents a category of subscribers, such as an enterprise department (e.g., legal department, Information Technology department, Human Resources department, Marketing department, etc.), employee title (e.g., Vice-President, attorney, contractor), subscriber skill (e.g., accounting, graphical artist, web design, word processing, technology expertise, legal expertise, etc.) or other grouping of subscribers. The type of input can be pre-configured, or the user can specify the type of input (e.g., First Name, Last Name, Initials, Skills, etc.) when entering a sequence of alphanumeric characters.

The voice terminal 205 is configured to provide the input to the interface 240, which accesses the directory 250 to search the directory and identify subscribers within the directory matching the input. For example, if the input includes the letters "FIS" of a last name of a subscriber, the interface 240 can search the directory 250 and retrieve a list of subscribers that have "FIS" as the first three letters in their last names. The interface 240 provides this list of subscribers to the presence server 160 and requests presence information 180 from the presence server 160 on each of the subscribers in the list. The presence server 160 retrieves the presence information 180 for each of the subscribers in the list and provides the retrieved presence information 180 to the interface 240.

In one embodiment, the presence information for each of the subscribers in the list indicates the general availability of that subscriber ("available" or "unavailable") for a communication session with the user. In other embodiments, the presence information 180 may also include additional information, such as the subscriber's availability per media type (voice, text, instant messaging or multimedia), current activity, current location, current status of active devices/applications of the subscriber and other presence information.

The amount and type of presence information 180 provided to the interface 240 for each subscriber in the list is dependent upon preference information 190 of both the subscriber and the user of the voice terminal 205. As described above, preference information 190 includes various filters in terms of privacy, prioritization, administrator policies and security considerations that operate to filter the presence information 180 provided to the voice terminal 205.

As a result, the preference information 190 of the subscriber may limit the scope of subscriber presence information 180 provided to the voice terminal 205. For example, the subscriber may want to provide calendar information (e.g., "in a meeting until 2:00," "out to lunch" or "on vacation until next Tuesday"), current location, media availability and other information to those users within the subscriber's department or group, but limit the presence information 180 to a general "available" or "unavailable" per media type to those users outside of the subscriber's department or group. Likewise, preference information 180 of the user of the voice terminal 205 may limit the scope of subscriber presence information 180 received by the voice terminal 205. For example, the user of the voice terminal 205 may want presence information 180 related to the media types of voice and instant messaging (IM), but not presence information 180 related to the media type of multimedia.

The interface 240 provides the list of subscribers matching the input, and the retrieved presence information 180 of each of the subscribers in the list to the voice terminal 205. In one embodiment, the list of subscribers and associated presence information 180 is displayed on the display 215 of the voice terminal 205 through the graphical user interface 210. In another embodiment, the list of subscribers and associated presence information 180 is audibly output to the user via a speaker on the voice terminal 205 using a voice synthesis/response module that is internal or external to the voice terminal 205 and interface 240. For example, in response to a request by the user to contact "Subscriber A," the voice synthesis/response module can produce the following audible output: "Subscriber A is on the phone. Would you like to send Subscriber A an Instant Message?"

The interface 240 provides the presence information 180 to the voice terminal 205 in any type of visual or audible format. Thus, the presentation of the presence information 180 to the user is customizable by the user and/or system administrator. For example, in one embodiment, the interface 240 provides a list of call options for initiating a communication session with a particular subscriber to the voice terminal 205 as the presence information 180 of that particular subscriber. In another embodiment, the interface 240 provides the presence information 180 of a particular subscriber to the voice terminal 205 in sections or levels to make it easier for the user to view the list of subscribers and associated presence information 180. For example, the interface 240 can organize the presence information 180 into presence levels, in which a first level includes the general availability of the subscriber, and subsequent levels include call options for initiating communication sessions and/or availability of the subscriber per media type.

The user of the voice terminal 205 (referred to herein as the "originating user") utilizes the list of subscribers and associated presence information 180 displayed on the graphical user interface 210 of the voice terminal 205 to originate a communication session towards one of the subscribers in the displayed list (referred to herein as the "destination user") while executing an enhanced dial-by-name feature on the voice terminal 205. For example, the originating user can select one of the names on the displayed list of subscribers as the destination user for a communication session, and use the presence information 180 associated with the destination user to determine the best time for the communication session, the preferred media type for the communication session and other factors relating to the communication session.

As an example, if the presence information of a destination user indicates that the destination user is currently unavailable for a communication session until 2:00 p.m., the originating user may decide to wait until after 2:00 p.m. to initiate the communication session towards the destination user or may decide to contact another destination user that is currently available. As another example, if the presence information of a destination user indicates that the destination user is currently in a meeting, the originating user may use this information to decide whether the communication session is important enough to interrupt the meeting.

Figure 3:
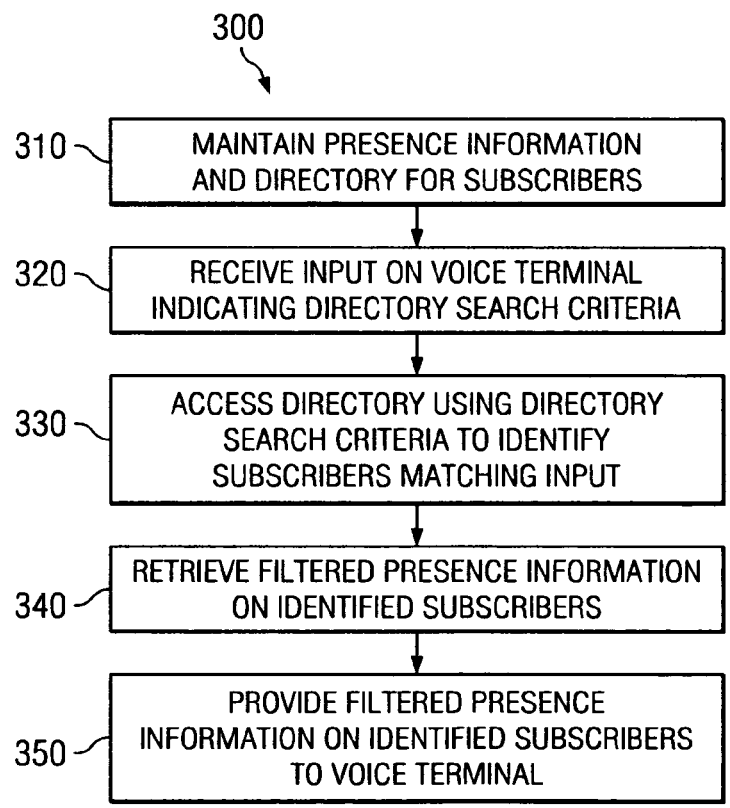
FIG. 3 is a flowchart illustrating an exemplary process for providing presence information to a voice terminal to enhance a dial-by-name feature, in accordance with embodiments of the present invention.

FIG. 3 is a flowchart illustrating an exemplary process 300 for providing presence information to a voice terminal to enhance a dial-by-name feature, in accordance with embodiments of the present invention. At block 310, a directory of subscribers and presence information indicating the availability of each of the subscribers in the directory is maintained. At block 320, a user enters input into the voice terminal indicating directory search criteria for searching the directory. For example, the input can include one or more letters of the first and/or last name of one of the subscribers in the directory or a category that defines a group of subscribers.

At block 330, the directory is accessed to identify a list of subscribers matching the input. For example, the list of subscribers can include those subscribers whose names match the input letters or those subscribers who belong to the input group. Once the list of subscribers is ascertained, at block 340, filtered presence information on each of the matching subscribers in the list is retrieved. Finally, at block 350, the list of matching subscribers, along with the filtered presence information on each of the subscribers in the list is provided to the voice terminal for use in implementing a dial-by-name feature to initiate a communication session towards one of the subscribers in the list.

Figure 4A:
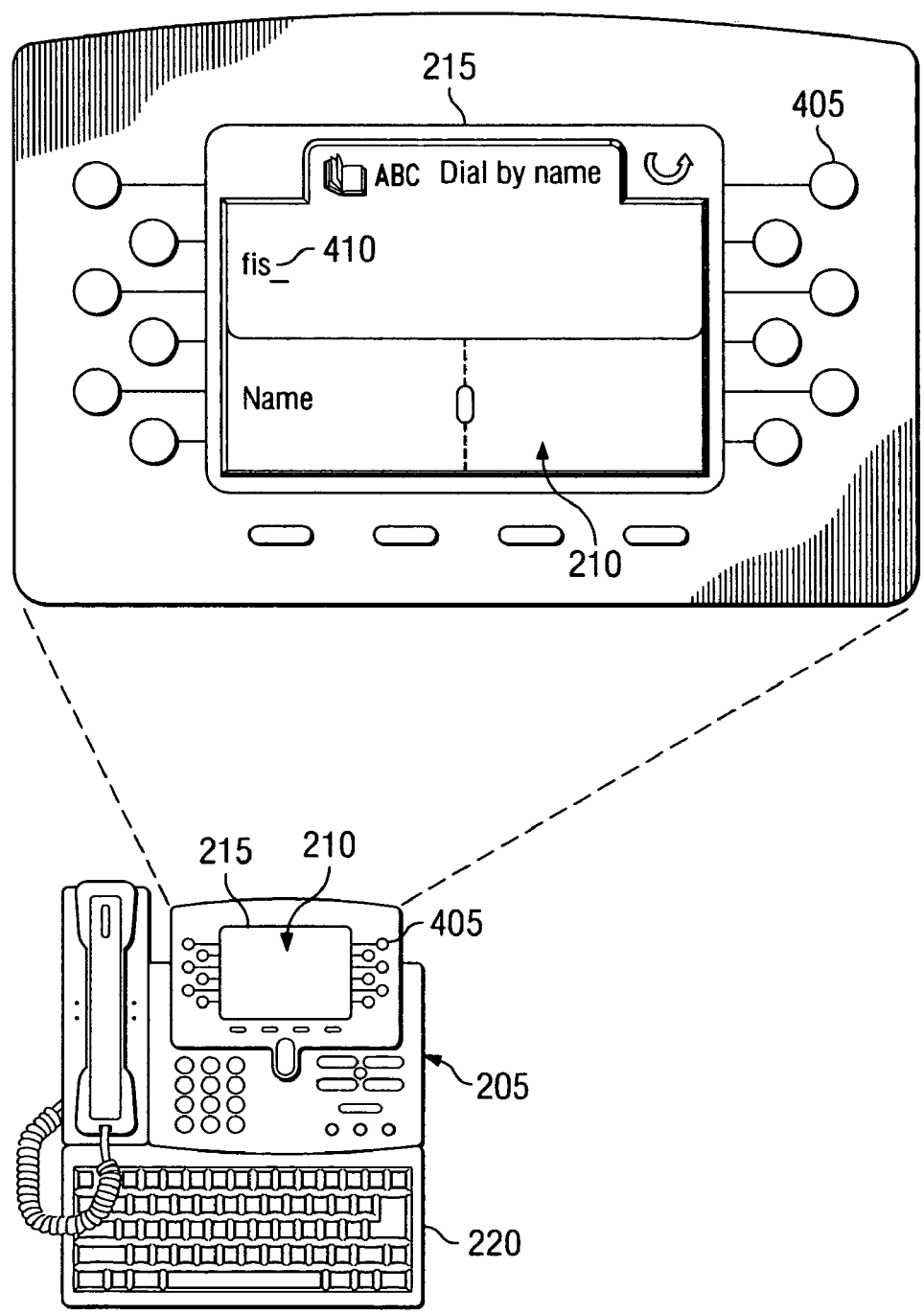
FIGS. 4A-4C illustrate an exemplary voice terminal for providing multiple levels of presence information to enhance a dial-by-name feature, in accordance with embodiments of the present invention.
Figure 4B:
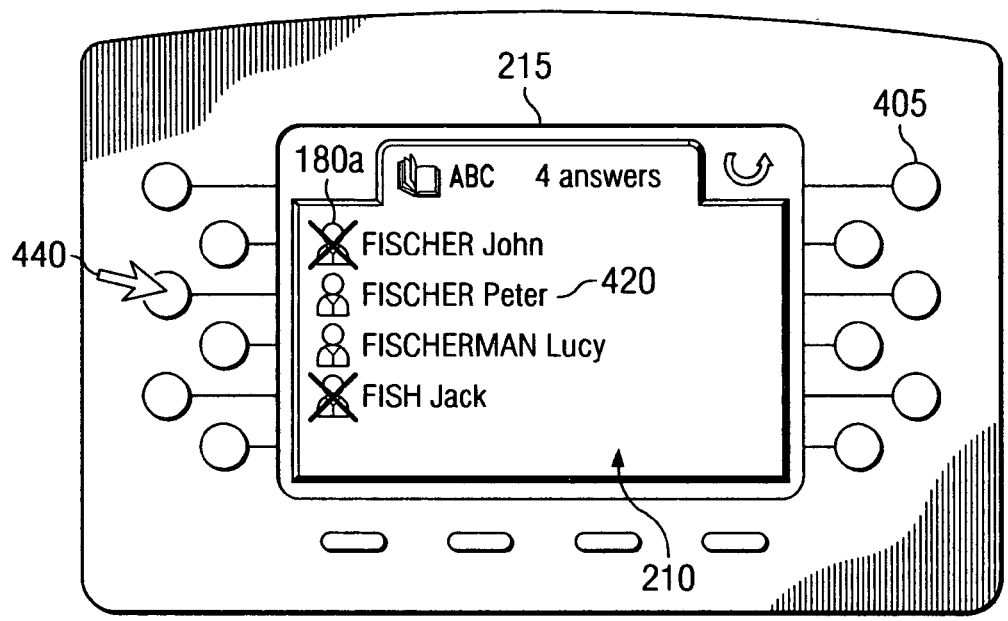
Figure 4C:
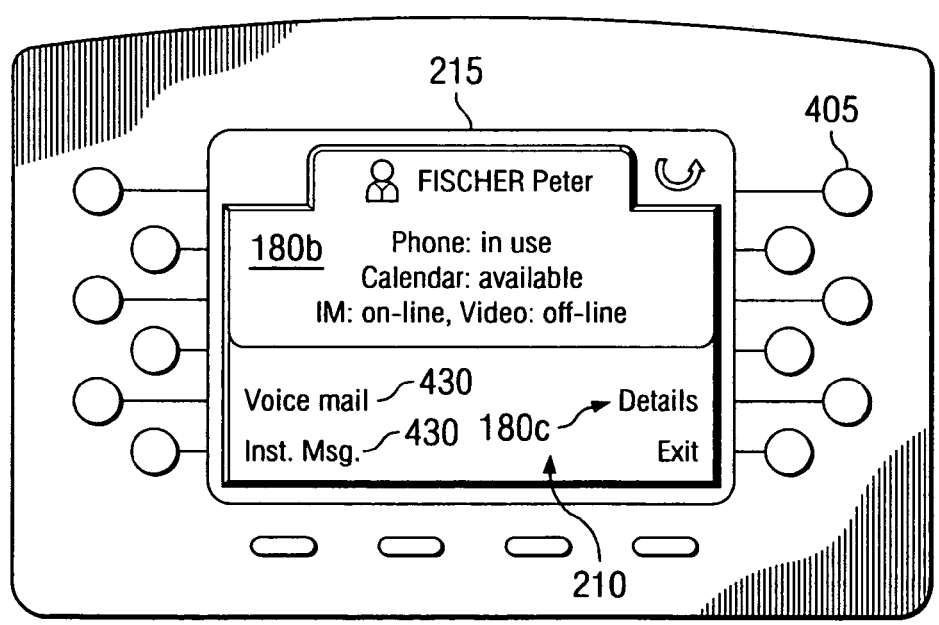

FIGS. 4A-4C illustrate an exemplary voice terminal 205 for providing multiple levels of presence information to enhance a dial-by-name feature, in accordance with embodiments of the present invention. The input device 220 (keyboard), display 215 and graphical user interface 210 on the display 215 of the voice terminal 205 are more clearly seen in FIG. 4A. In addition, the voice terminal 205 includes selection keys (buttons) 405 adjacent the display 215 for enabling the user to select one or more options displayed on the graphical user interface 210.

In FIG. 4A, the graphical user interface 210 provides a prompt for a user to enter input 410 (letters "FIS") to implement a dial-by-name feature. The voice terminal 205 uses the input to retrieve a list of subscribers that have "FIS" as the first three letters in their last names. An example of such a list 420 is shown in FIG. 4B. In addition to the list 420 of subscribers, the graphical user interface 210 in FIG. 4B also displays presence information 180a for each of the subscribers in the list 420. For example, as shown in FIG. 4B, the presence information 180a is presented as an icon adjacent to each subscriber in the list 420. The icon is in the form of a person, and has an "X" marked through it if the subscriber is unavailable for a communication session. Thus, in FIG. 4B, subscribers "John Fischer" and "Jack Fish" are currently unavailable for a communication session, while subscribers "Peter Fischer" and "Lucy Fischerman" are currently available for a communication session.

The presence information 180a in FIG. 4B is merely a first level of presence information that indicates to the user only the general availability of the subscriber for any type of communication session (e.g., voice/phone, text, IM or multimedia/video). To view more detailed presence information on a particular subscriber, the user presses the selection key 405 adjacent to or pointing to the particular subscriber in the list 420. For example, as shown in FIG. 4B, the user selects subscriber 440 ("Peter Fischer") by pressing on the selection key 405 associated with "Peter Fischer."

Referring now to FIG. 4C, once the user selects a particular subscriber, the graphical user interface 210 provides another screen on the graphical user interface 210 including a second level of presence information 180b that indicates to the user the availability of the subscriber 440 for each media type. For example, as shown in FIG. 4C, the second level of presence information 180b indicates that subscriber 440 "Peter Fischer" is currently available for an IM communication session. However, subscriber 440 "Peter Fischer" is also currently involved in a telephone conversation.

If the user desires additional presence information 180c about subscriber 440 "Peter Fischer" to determine whether to initiate an IM communication session to subscriber 440 "Peter Fischer," the user presses on the selection key 405 adjacent the word "Details" on the graphical user interface 210 to view more presence information on subscriber 440

"Peter Fischer." For example, the additional presence information 180*c* may indicate that subscriber 440 "Peter Fischer" is currently involved in a telephone conversation with an important customer or his boss, and therefore, does not wish to be interrupted. This may cause the user to postpone initiating a communication session until the telephone conversation is completed. As another example, the additional presence information 180*c* may indicate that subscriber 440 "Peter Fischer" is currently on-hold, and therefore, would not be distracted by an IM communication session.

In addition to the availability of the subscriber per media type, the second level of presence information 180*b* in FIG. 4C further includes call options 430 for initiating a communication session with subscriber 440 "Peter Fischer." As mentioned above, subscriber 440 "Peter Fischer" is currently available for an IM communication session. Therefore, to facilitate an IM communication session with "Peter Fischer", the graphical user interface 210 provides the user the option of initiating an IM communication session, which the user can select by pressing on the selection key 405 adjacent to the IM call option. The graphical user interface 210 in FIG. 4C further provides the call option 430 of accessing subscriber 440 "Peter Fischer's" voice mail if the user does not wish to initiate an IM communication session at this time, but does want to leave a message for the subscriber.

The presence information 180 and format of that presence information 180 provided to the user in each screen of the graphical user interface 210 is customizable and configurable by the user, subscriber and system administrator. Thus, each screen on the graphical user interface 210 can contain one or more levels of presence information 180, and the type of presence information 180 included in each level can vary between systems, users and subscribers.

Figure 5:
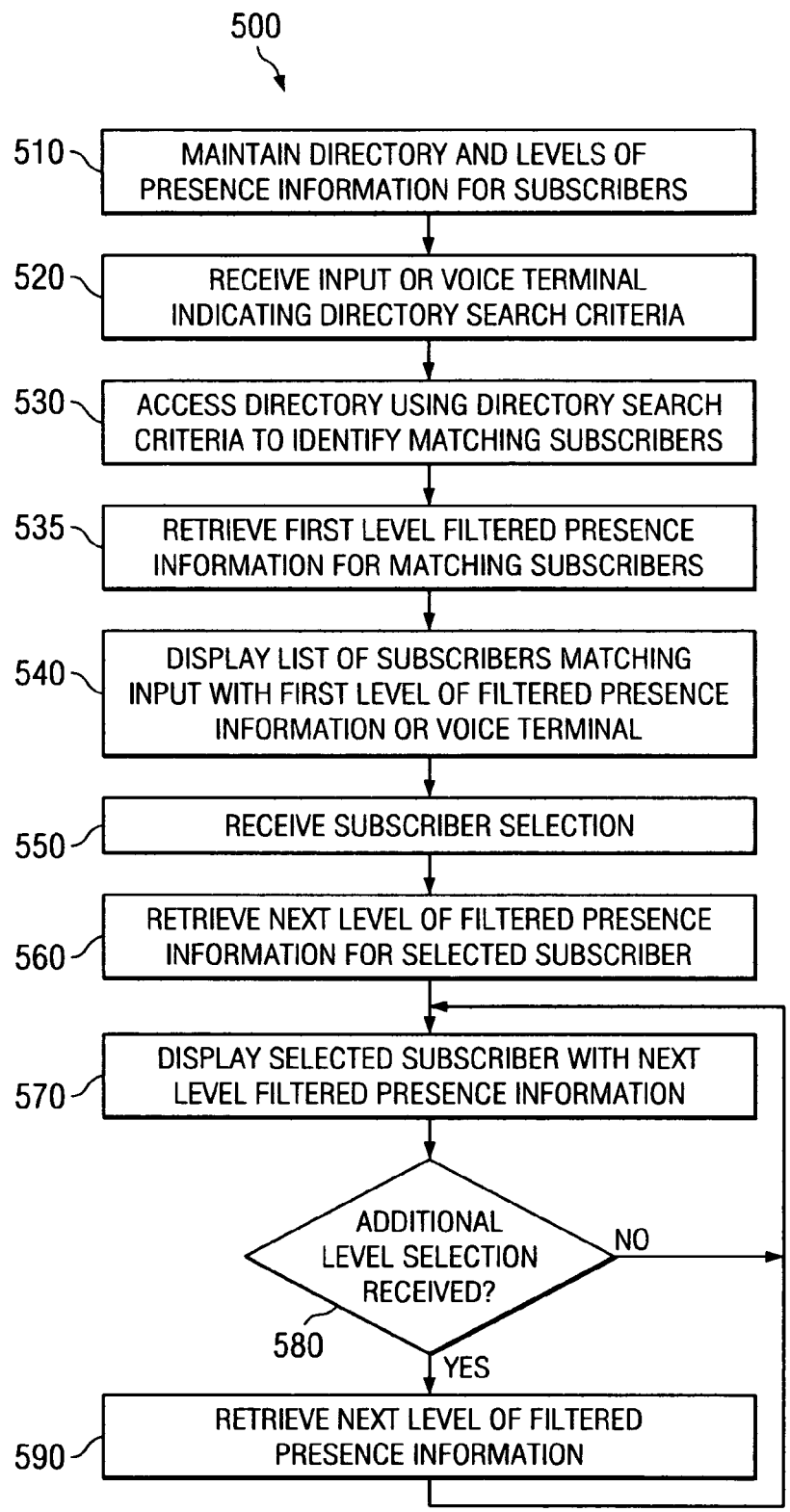
FIG. 5 is a flowchart illustrating an exemplary process for providing multiple levels of presence information, in accordance with embodiments of the present invention.

FIG. 5 is a flowchart illustrating an exemplary process 500 for providing multiple levels of presence information to a voice terminal, in accordance with embodiments of the present invention. At block 510, a directory of subscribers and levels of presence information indicating the availability of each of the subscribers in the directory is maintained. At block 520, a user enters input into the voice terminal indicating directory search criteria for searching the directory. At block 530, the directory is accessed to identify a list of subscribers matching the input. Once the list of subscribers is ascertained, at block 535, a first level of filtered presence information on each of the matching subscribers in the list is retrieved. Thereafter, at block 540, the list of matching subscribers, along with the first level of filtered presence information on each of the subscribers in the list is provided to the voice terminal. For example, the first level of filtered presence information can indicate merely the general availability of each subscriber for any type of communication session (e.g., voice/phone, text, IM or multimedia/video).

At block 550, the user selects a particular subscriber on the list for which the user needs additional presence information. At block 560, the next level of filtered presence information on the selected subscriber is retrieved, and at block 570, the selected subscriber, along with the next level of filtered presence information associated with that subscriber is provided to the voice terminal. For example, the second level of filtered presence information can indicate the availability of the subscriber for each media type and/or call options for initiating a communication session with the subscriber. At block 580, a decision is made whether the user desires additional presence information about the subscriber. If so (Y branch), at block 590, the next level of filtered presence information on the selected subscriber is retrieved, and at block 570, the selected subscriber, along with the next level of filtered presence information associated with that subscriber is provided to the voice terminal. If not (N branch), the voice terminal continues to display the current level of filtered presence information for the selected subscriber at block 570.

Figure 6:
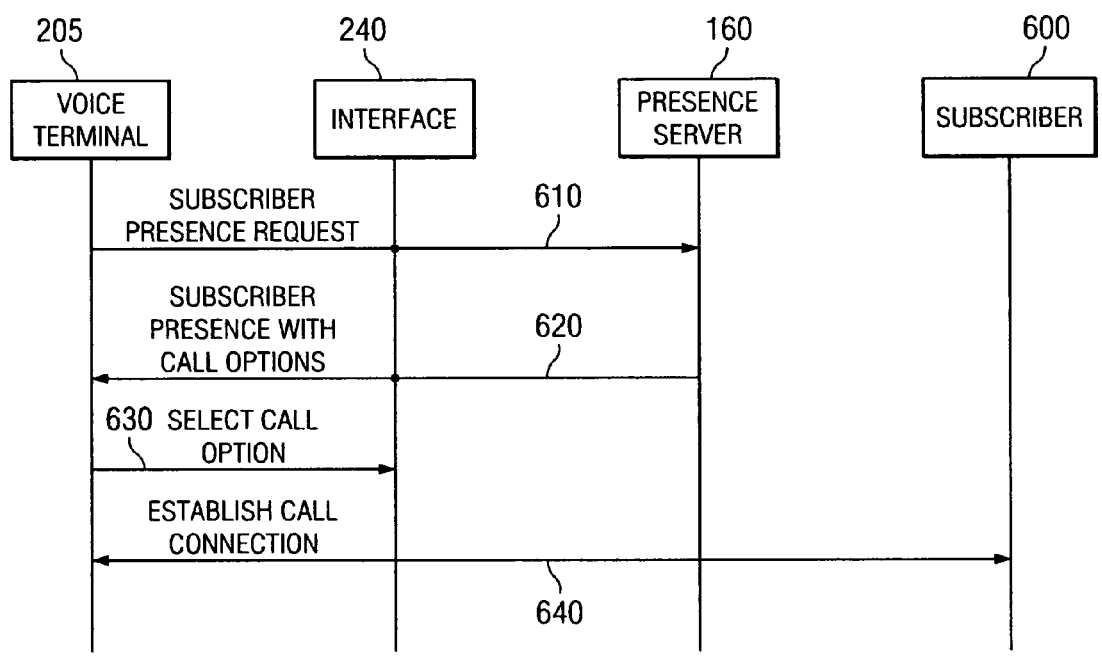
FIG. 6 is a signal flow diagram illustrating an exemplary call flow using an enhanced dial-by-name feature, in accordance with embodiments of the present invention.

FIG. 6 is a signal flow diagram illustrating an exemplary call flow using an enhanced dial-by-name feature, in accordance with embodiments of the present invention. In FIG. 6, at step 610, the voice terminal 205 sends a request for presence information for a particular subscriber 600 to the presence server 160 via the interface 240. For example, the user may select a particular subscriber 600 from a list of subscribers displayed on the voice terminal 205 that the user is interested in initiating a communication session towards, and this selection is formatted by the interface 240 into a request for additional presence information towards the presence server 160. At step 620, the presence server 160 provides to the voice terminal 205 via the interface 240 the requested presence information for the subscriber 600, along with call options for initiating a communication session with the subscriber 600. For example, the voice terminal 205 may display one or more of the following call options: Instant Message, Mobile Phone, Desktop Phone, Text Message, Multimedia/Video and Voice Mail.

From the displayed call options, the user selects one of the call options, and at step 630, the selected call option is transmitted to the interface 240. The interface 240 uses the selected call option to initiate a communication session between the voice terminal 205 and the subscriber 600 through a communications network. For example, as shown in FIG. 6, at step 640, a call connection is established between the voice terminal 205 and the subscriber 600.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A communication system for providing an enhanced dial-by-name feature, comprising:
   a directory of subscribers within said communication system;
   a voice terminal configured to receive speech input from a user indicating directory search criteria for searching said directory to identify said subscribers matching said input and to provide both a list of said subscribers matching said input and presence information on each of said subscribers in said list to said user, wherein said presence information for each of said subscribers indicates availability of said respective subscriber;
   a presence system for collecting and storing said presence information on said subscribers, wherein said presence system is operable to provide said presence information on each of said subscribers in said list to said voice terminal; and
   a private branch exchange (PBX) coupled to said directory, said voice terminal and said presence system and providing an interface between said voice terminal, said directory and said presence system for receiving said input from said voice terminal, accessing said directory to retrieve said list of subscribers, providing said list of subscribers to said presence system to retrieve said presence information and providing said list of subscribers and said presence information to said voice terminal; wherein said presence information is organized into presence levels, a first one of said presence levels indicating availability of said subscribers in said list and a subsequent one of said presence levels of a subscriber of said subscribers indicating availability of the subscriber per media type, said subsequent level is retrieved in response to the user selection via user interface from said presence level.

2. The communication system of claim 1, wherein said input includes a character set for a name of one of said subscribers or a group of said subscribers, wherein said character set includes one or more letters, syllables or words.

3. The communication system of claim 1, wherein said input includes a character set for a category of subscribers and said list includes said subscribers in said category, wherein said character set includes one or more letters, syllables or words.

4. The communication system of claim 1, wherein said interface is further connected to receive a select one of said call options and is operable to initiate said communication session to said select subscriber using said select call option.

5. The communication system of claim 1, wherein said presence system further maintains preference information for each of said subscribers, said preference information filtering said presence information provided to said voice terminal.

6. A private branch exchange (PBX) for providing an enhanced dial-by-name feature, comprising:
   an interface coupled to a voice terminal, a directory of subscribers and a presence system, said interface including software instructions operable to:
      receive user speech input from said voice terminal, said input indicating directory search criteria for searching said directory to identify a list of subscribers matching said input;
      access said directory to retrieve said list of subscribers;
      provide said list of subscribers to said presence system to retrieve presence information on each of said subscribers in said list of subscribers, wherein said presence information for each of said subscribers in said list of subscribers indicates availability of said respective subscriber; and
      provide said list of subscribers and said presence information to said voice terminal; and
   a processor operable to execute said software instructions of said interface; wherein said presence information is organized into presence levels, a first one of said presence levels indicating availability of said subscribers in said list and a subsequent one of said presence levels of a subscriber of said subscribers indicating availability of the subscriber per media type, said subsequent level is retrieved in response to the user selection via user interface from said presence level.

7. The PBX of claim 6, wherein said input includes a character set for a name of one of said subscribers or a group of said subscribers, wherein said character set includes one or more letters, syllables or words.

8. The PBX of claim 6, wherein said input includes a character set for a category of subscribers and said list includes said subscribers in said category, wherein said character set includes one or more letters, syllables or words.

9. The PBX of claim 6, wherein a subsequent one of said presence levels includes said presence information providing call options for initiating a communication session with a select one of said subscribers in said list.

10. The PBX of claim 6, wherein said interface is further connected to receive a select one of said call options from said voice terminal and is operable to initiate said communication session to said select subscriber using said select call option.

11. The PBX of claim 6, wherein said presence information retrieved by said interface is filtered by said presence system using preference information for each of said subscribers.

12. A method for providing presence information from a private branch exchange (PBX) to a voice terminal to enhance a dial-by-name feature, comprising:
   receiving user speech input from said voice terminal at said PBX, said input indicating directory search criteria for searching a directory of subscribers to identify a list of subscribers matching said input;
   accessing said directory, by said PBX, to retrieve said list of subscribers;
   providing said list of subscribers from said PBX to a presence system;
   retrieving presence information on each of said subscribers in said list of subscribers at said PBX from said presence system, wherein said presence information for each of said subscribers in said list of subscribers indicates availability of said respective subscriber; and
   providing said list of subscribers and said presence information from said PBX to said voice terminal; wherein said presence information is organized into presence levels, a first one of said presence levels indicating availability of said subscribers in said list and a subsequent one of said presence levels of a subscriber of said subscribers indicating availability of the subscriber per media type, said subsequent level is retrieved in response to the user selection via user interface from said presence level.

13. The method of claim 12, further comprising:
   receiving a select one of said call options at said PBX from said voice terminal; and
   initiating said communication by said PBX to said select subscriber using said select call option.

14. The method of claim 12, wherein said retrieving said presence information further comprises:
   retrieving filtered presence information from said presence system, said filtered presence information being filtered for each of said subscribers in said list of subscribers using respective preference information.

* * * * *